United States Patent Office 3,236,944
Patented Feb. 22, 1966

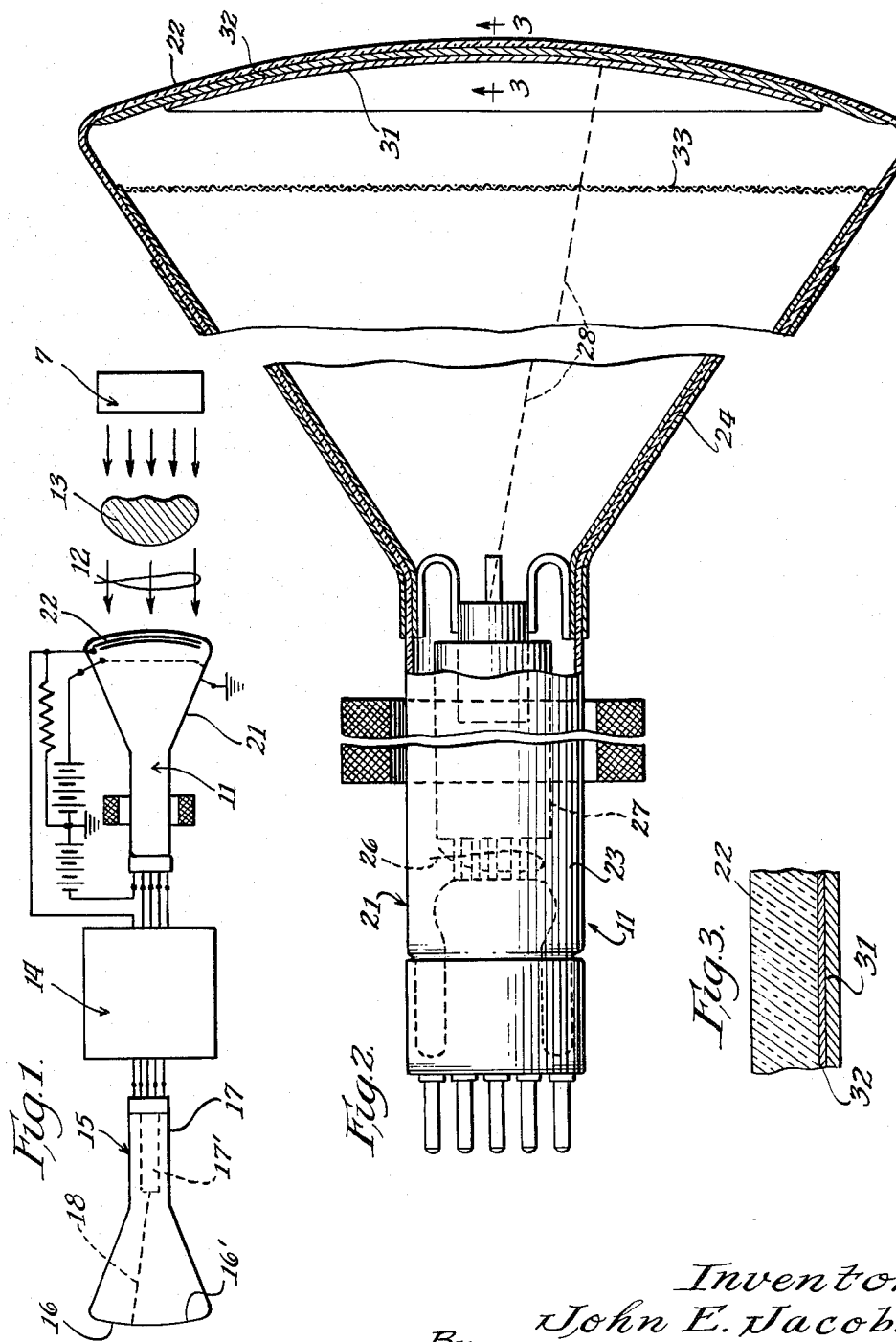

3,236,944
ULTRASOUND VISUALIZATION SYSTEMS
John Edward Jacobs, Evanston, Ill., assignor to Northwestern University, Evanston, Ill., a corporation of Illinois
Filed July 16, 1962, Ser. No. 209,843
2 Claims. (Cl. 178—6.8)

The present invention relates in general to electronics, and has more particular reference to a system for visualization of ultrasound images.

More specifically, the present invention is directed toward an acoustically hyper-sensitive television camera tube which provides the means of expanding the use of ultrasound in biological investigations.

The prior art transducers used for this purpose are constructed so that in operation the tubes measure the secondary emission from scanned piezoelectric plates. In contrast, the present invention is directed to a system in which ultrasound sensitive television camera tubes utilizing scanned semiconductive layers convert the acoustical image to an electrical charged pattern.

For the purpose of the present disclosure, an ultrasound-sensitive semiconductor may be defined as a material having electrical resistance, or reactance, or both, which vary in accordance with the intensity of ultrasound rays to which the substance is exposed. Electrical resistance and capacity reactance, are those characteristics of electrical conductors which tend to prevent the flow of electrical current therethrough under the influence of an electromotive force. The combined flow resistance effect of resistance and reactance in a conductor material is commonly referred to as the electrical impedance of the material.

In the absence of rays to which it is responsive, a semiconductor may have impedance characteristics of such high order as to constitute it as a virtual insulator capable of substantially preventing the flow of electrical current therethrough. When irradiated with rays to which it is responsive, the impedance of the semiconductor material may be reduced as a proportional function of incident ray intensity, so that the material becomes electrically conducting in proportion to the intensity of exciting rays impinging thereon. As a consequence, such phonon-induced or controlled change in the impedance of the semiconductor may be measured in terms of current flow therethrough, or in terms of voltage developed in an associated impedance measuring circuit, in order to determine the intensity of rays impinging on the semiconductor.

It is known in the prior art that latent invisible picture images of an object may be formed or entrained in a beam of penetrating rays, such as X-rays, gamma rays, or other invisible ray-like emanations of penetrating character, by causing the rays to traverse or scan the object to be pictured. Visible light rays also may carry latent picture images which may be converted to visible form by the eye of an observer or by photographic techniques. Latent picture images entrained or carried in penetrating ray beams may also be reduced to visible form by photographic procedures, as by applying the image carrying beam upon a film of ray-sensitive material, as is common in X-ray photography or radiography. It is also conventional, as in X-ray fluoroscopy, to convert latent picture images to visible form by applying the image carrying ray beam directly upon a sensitive screen adapted to glow differentially in proportion to the intensity of rays impinging thereon, and thus to reproduce the latent ray carried images as a visible fluorescent picture on the screen.

Latent picture images carried by optically visible as well as invisible rays may be converted to electrical signal impulses capable of transmission to remotely located signal responsive picture reproducing devices, such as picturing tubes of the sort commonly employed for television picture reproducing purposes, by applying image carrying rays upon the envelope-enclosed ray-sensitive layer of semiconducting material which forms a component of the transducing device. Image transducing devices of the character mentioned commonly include electron beam scanning means for producing electrical signal pulsations corresponding to the impedance characteristics of the scanned layer, as determined by the intensity of image carrying rays applied thereto.

The present invention constitutes an advance in the field of image transducing and is directed to devices and to techniques and methods by which ultrasound radiations rather than X-ray, gamma rays, or other highly penetrating emanations are used to provide a pictorial representation or an image of an object exposed to or scanned by such an ultrasound energy source. The invention has particular utility in the nondestructive study of biological tissues and specimens of similar nature. The methods of the invention avoid the deleterious effects of high penetrating and destructive radiation such as X-rays and gamma rays.

There are available in the prior art several techniques permitting the visualization of images resulting from ultrasound. None, however, is completely satisfactory. For the purposes to which the present invention is directed, the discussion here of prior art techniques is limited to those systems which produce an image plane normal to the direction of travel of the sound wave in contrast to those systems forming an image by use of a radar type scan.

One prior art system permitting the visualization of an ultrasound image depends upon the ability of the impinging ultrasound to quench the fluorescence of a long persistent phosphor. In such a system, the phosphor is excited, usually by ultraviolet radiation, for a brief period. The exciting ultraviolet radiation is then turned off following which the phosphor continues to glow. An ultrasound image is then caused to impinge upon the phosphor layer. The effect of the impinging ultrasound is to discharge rapidly the trapped electrons. The discharge of the trapped electrons results in a darkening of the fluorescence afterglow and this darkening is in direct proportion to the amount of ultrasound energy which is absorbed. This technique, though usable, does not provide bright images and does not offer the advantages of remote viewing. However, the penomenon, that is, the ability of ultrasound to influence the trap population in certain semiconductors, is, as will be pointed out, a useful one provided the electrical properties rather than the optical properties of the material are measured.

A second method for visualization of ultrasound images, and a method which has received some commercial application, is based upon the ability of absorbed ultrasound to align small metal particles dispersed in a liquid. The resultant alignment of these particles is then viewed by means of a second radiation which is reflected from the particles. This system, however, suffers the lack of contrast and from inability to follow motion.

A third method that has been proposed for the visualization of ultrasound images is based on the use of absorbed ultrasound to control by thermal action photo emission of electrons from a suitable surface. These electrons, as emitted, would then be accelerated in accordance with standard image converter practice. To the best of the applicant's knowledge, a tube constructed along these lines has not been demonstrated.

In still other work, studies have been made of television camera tubes which are sensitive to ultrasonic energy. These tubes have been designed around a piezoelectric plate whose piezoelectric voltage is read by a scanning beam. Since the piezoelectrically induced voltage is an alternating one, the only signal obtained from a specific point of the image pattern is that signal which exists at the instant the scanning or reading beam touches that point. While tubes based on this principle, that is, the scanning of a quartz plate, produce images of the absorbed ultrasound energy, it appears that they have not been thoroughly investigated as an aid to diagnostic medicine.

By utilization of some of the systems described above, workers in the field report having resolved objects of a diameter of 0.1 millimeter provided these objects are of high contrast and are placed in contact with the transducing layer. However, all images obtained to date of biological specimens having some depth in the image plane are markedly inferior to those obtained by radiographic techniques. This is due to the formidable problem of acoustical images, which, as in the case of the production of images through the use of other radiation sources, is present when the radiation source is an ultrasonic frequency.

From a consideration of the prior art techniques and of their inherent inadequacies it appears that a more successful approach to solution of this problem of achieving high quality large area images with ultrasound energy is to resort to higher frequencies and to the use "far optics."

It is a principal object of the present invention to provide an improved means for and a method of producing intensified electrical charge patterns corresponding to latent images carried by a beam of ultrasonic rays thereby to actuate picture reproducing equipment of the sort commonly employed for producing visible television pictures.

It is another important object of the present invention to provide means for and a method of producing visible pictures, corresponding to images latently carried by ultrasonic rays.

Other important objects are the following: to provide the direct conversion of ultrasonic ray energy to an electrical charge pattern, which charge pattern is subsequently scanned by an electron beam; to accomplish the transformation of ultrasonic ray energy to an electrical charge pattern within a thin plate or film of substantially uniform thickness and comprising an ultrasonic-energy-sensitive semiconductor; to apply latent image carrying ultrasonic rays upon a semiconductor film or panel to produce therein a corresponding electrical image defined by differences in the electrical condition of the various portions of the semiconductor layer; to provide for the intensification of the image defining electrical differences in order to enhance the carried image; to produce electrical impulses corresponding with latent ultrasonic-ray-carried images by applying image carrying rays upon a film of ultrasonic-ray-sensitive material having impedance characteristic which fluctuate precisely in accordance with the intensity of image carrying rays impinging thereon; to provide for the measurement of impedance variations in each interval portion of the ultrasonic-ray-sensitive layer in terms of electrical current flow therein whereby to produce electrical impulses corresponding with the degree of ray excitation of the layer, and hence with the latent picture image carried by the layer exciting rays; to provide a system based on television techniques to permit the visualization of ultrasound images; to provide a technique by which the visualization of ultrasound images may be applied to solve biological problems; to provide improved storage type television camera tubes responsive to ultrasound radiation; and to provide improved phonon-responsive semiconductors of extraordinary high purity.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:

FIGURE 1 is a diagrammatic view showing apparatus for producing visible images in accordance with the teachings of the present invention;

FIGURE 2 is an enlarged sectional view taken through an ultrasonic ray transducer embodying the present invention and forming part of the apparatus shown in FIGURE 1; and FIGURE 3 is a sectional view taken substantially along the line 3—3 in FIGURE 2.

A basic and fundamental proposition related to the inventive concept of the present invention is that in order to approximate the "image geometry" desired, higher ultrasound frequencies and far optics must be used. Each of the variations or refinements required in utilizing these techniques is in a direction to require an increase of many orders of magnitude in the sensitivity of pickup tubes or ultrasound receiver. The present invention is directed to devices and to methods by which this large increase in sensitivity may be achieved.

The most advanced tubes constructed by one researcher (Prokhorov) are said to respond to input energy levels of the order of $3 \times 10^{-9}$ watts/cm.$^2$. These tubes are acknowledged as not exhibiting the storage feature which will be discussed hereinafter. This storage feature, if incorporated in accordance with the teachings of the present invention, will increase the sensitivity of the tubes by a factor approaching $10^5$.

Still another researcher (Wild) working in the medical field, has reported the use of a single channel viewing system which subjected the patient to intensities of 3 watts/cm.$^2$. Measurement of the exit energy at the rear of the chest cavity showed this to be $3 \times 10^{-5}$ watts/cm.$^2$, well above the value needed to energize the transducer. Thus, it appears that sensitivity of the system would not be a problem if the image forming characteristics of the ultrasound system permitted (X-ray like) geometrical arrangements between the irradiating source and the image forming transducer. This is known not to be the case if large thick regions are to be studied.

In accordance with the practice of the present invention "image geometry" is approximated through the use of the combination of higher ultrasound frequency and far optics. The techniques demand greatly increased pickup tube sensitivity, and it is to the structure, composition, and circuits of useful new storage-type television camera tubes that important embodiments of the present invention are directed.

High performance television camera tubes require that at some point between the transducer of the incoming radiation and the output of the tube provision be made to provide a storage element. This requirement follows from the nature of the scanning process itself. In the scanning process each element of the image is touched by the scanning beam for only a fraction of the time during which the image is created. To be specific, if an image is created every $\frac{1}{30}$ of a second and the image contains 200,000 elements, the scanning beam will touch each element for a period of $\frac{1}{30}$ times 1/200,000 or $\frac{1}{6}$ millionth of a second providing 30 pictures presented per second. The interval between the successive touching of a particular element by the scanning beam is a vital one as far as ultimate sensitivity of the system using the pickup tube is concerned. To achieve maximum sensitivity, means must be provided to have the individual elements accumulate, during this interval, a signal that is representative of the total energy received by the element between scans. The ultrasound television camera tubes built to date do not provide for this feature. As a result, their sensitivity is limited to a fraction (in the case cited 1/200,000) of that obtainable if this storage feature is provided. Because of the alternating characteristics of the voltage produced by a piezoelectric element, it is believed that an ultrasonic-sensitive piezoelectric target providing this storage feature would be extremely difficult to fabricate. Therefore, it is proposed, as outlined below, to provide other means for deriving an electrical signal from absorbed ultrasound energy to provide this storage effect.

Prior art camera tubes of the television type used as a storage element in material having a high resistance that is controlled either directly or indirectly by the incident radiation. The present invention relates to parallel effects resulting from ultrasound absorption.

There exists at least three well established mechanisms for influencing the resistance of materials by means of absorption of ultrasound energy. The first of these, as previously mentioned in connection with a visual display of ultrasound energy, is the ability of absorbing ultrasound to change the population of traps in certain materials. Fortunately, materials exhibiting these properties also have a resistivity sufficiently high to permit storage-type operations.

A second important property of material which has been investigated in relatively few semiconductors is piezo resistance. Materials such as germanium and silicon known to exhibit piezo resistance changes of a magnitude sufficient for use in the construction of storage television camera tubes have a resistivity too low for proper operation in a storage-type camera tube. Other materials, however, such as titanium dioxide have been found suitable.

A third possible approach to the detection of ultrasound is to resort to the change in resistance of certain semiconductors due to the localized heating resulting from the ultrasound. Tubes based on this principle are not very practicable because of the low sensitivity and slow response.

During the research carried out which resulted in the present invention, it has been determined that while all materials studied exhibit some change in conductivity upon irradiation by ultrasound, the power to retain a ray-induced or phonon-induced image varies as a characteristic of the particular ray-sensitive semiconductor material employed. Some of the materials, particularly the highly activated cadmium sulfide-copper, exhibit changes of sufficient magnitude to saturate the associated electronics. Over the limited frequency range investigated, there do not appear to be any frequency-dependent effects. In meeting the special requirements of the invention, it has been found that a semiconductor material such as cadmium sulfide containing copper as an activator is a preferred composition. Impurities, even in trace quantities, have been found to affect adversely the sensitivity and the storage ability of the phonon-responsive coatings, and it is an important feature of the present invention that compositions of an extraordinarily high degree of purity are essential and are used.

In the work carried out in perfecting the present invention, demountable electron scanning systems of ultrasonic television camera tubes have been used. A storage tube in which the sensitive layer is a material of the zinc sulfide type, has been found to perform best when the sensitive layer is cadmium sulfide activated with copper. Tubes having layers of this particular composition show a sensitivity in the order of $10^{-8}$ watts/cm.$^2$, a resolving power limited by the ultrasound optics, and a speed of response in the order of 10 milliseconds. The tubes were fabricated using conventional settling techniques for the phonon-sensitive cadmium sulfide layer. Another technique which has been employed is deposition of sensitive films by evaporation. This latter technique affords improved adherence of the sensitive layer to the glass substrate.

To illustrate the invention, the drawings show picture producing apparatus comprising a penetrating ray transducer 11 adapted to receive the penetrating rays 12 such as ultrasonic rays, emanating from any suitable ultrasonic ray source 7 and latently carrying the image of an object 13 disposed in the path of the rays 12 between the ray source 7 and the transducer 11. The transducer is adapted to develop electrical conductivity patterns corresponding to the characteristics of the image of the object 13 latently carried by the rays 12. The transducer accordingly may be interconnected with a suitable translation system 14 for transmitting electrical impulses to and applying the same for the operation of a picture reproducing tube 15 generally of the sort commonly employed for television picture producing purposes, whereby the picture reproducing tube 15 may be operated for the reproduction of a visible picture corresponding to the latent picture image carried by the rays 12 and applied to the transducer 11.

The tube 15 may comprise a sealed and evacuated envelope having an enlarged end providing a wall 16 of transparent material, such as glass, and embodying a conventional picture producing screen 16' of fluorescent material adapted to glow in response to electron impingement thereon, the envelope, remote from the end thereof, forming a barrel 17 containing a suitable electron gun structure 17' for generating and applying a pencil-like scanning beam 18 upon the picture producing screen at the wall 16. The picture producing tube 15 also may include associated beam deflection means of any suitable or preferred character, including electrostatic deflecting plates within the envelope.

The production of the picture is, of course, controlled in accordance with fluctuating electrical impulses applied to the electron gun 17' for the production and intensity control of the electron beam 18, in accordance with well known television reproducing procedures, electrical impulses, as shown in FIG. 1, being applied to the electron gun 17' through the translation system 14.

In order to develop electrical impulses for the operation of the picture producing tube 15 to produce a visible picture corresponding to the latent picture image of the object 13 carried by the ultrasonic rays 12, the transducer 11, as shown more particularly in FIGURE 2, may comprise a sealed and evacuated envelope 21, preferably of glass and having a sleeve-like body enlarged at one end to form an end wall 22, providing a latent image pickup station adapted to be disposed in the path of the image carrying rays 12. As shown, the sleeve-like body may comprise a tubular portion 23 forming the end of the envelope remote from the end wall 22, and a tapered or flared portion 24 extending between and integrally connected with the marginal edges of the end wall 22 and the facing end of the sleeve portion 23.

The envelope 21 provides a housing containing a suitable electron gun structure 27 of any preferred form and mounted within the sleeve portion 23 of the envelope. The electron gun structure 27 is connected electrically with conductors 26 to the translation system 14. The gun structure includes a suitable electron emission element and electron guiding means for producing an electron beam 28 of pencil-like character, and for applying the same upon the end wall 22. The gun structure may include beam controlling and deflecting means of any suitable or preferred character, including electrostatic deflecting plates within the envelope and deflecting coils disposed outwardly of the envelope, for directing the scanning beam to traverse the screen or end wall progressively and successively, in accordance with a selected scanning pattern. Thus, in conformance with conventional practice, the screen may be excited to respond differentially in accordance with the fluctuating intensity of the scanning ultrasonic beam. A conventional metal screen or grid 33 is positioned within the envelope 21 in spaced, substantially parallel relationship with respect to the end wall 22.

Latent image pickup means 31 may be supported on the inwardly facing surface of the end wall 22 of the envelope 21 in the path of the image carrying rays 12 and in alignment with the electron gun structure 27 to provide an ultrasonic-sensitive layer. The glass end wall 22 is coated with a thin deposit or film 32 of a conductive material such as aluminum, stannic chloride ($SnCl_4$) or other suitable conducting material adapted to be applied as a coating. The ultrasonic-ray-sensitive material 31 may be deposited or superimposed, in turn, on the conductive film 32, as indicated in FIGURE 3.

The ultrasonic-ray-sensitive material 31 on the end wall 22 is adapted to respond, at the place of impingement of the beam 12, in accordance with the fluctuating intensity of the beam 12. Since the ultrasonic-sensitive material 31 supported on the glass 22 is of a semiconducting material, its conductivity will change in response to the ultrasonic rays impinging thereon, as hereinbefore explained. The production of the ultimate picture is, of course, caused by the fluctuating electrical conductivity of the screen as scanned by the electron gun 27. A more exhaustive discussion of the general theory and operation of semiconductors and of related circuitry is disclosed in U.S. Patent No. 2,951,898 dated September 6, 1960, and the entire disclosure of that patent is specifically incorporated herein, to the extent that it is not inconsistent herewith.

The image pickup means 31, as shown, comprises a relatively thin layer of an ultrasonic-ray-sensitive material 31, the layer having substantially uniform thickness and being coated upon and in electrical contact with a conductive layer 32, all supported upon a substrate 22. The fluctuating electrical impulses resulting from activation of the layer 31 by the ultrasonic beam 12 are read by the scanning movement of the beam 28, as shown in FIGURE 1, and are delivered through the translation system 14 for viewing on the screen 16 in accordance with well known television picture reproducing procedures.

It is an important feature of the ultrasonic image converter of the present invention that it finds utility not only in continuous-wave applications, and also in important new techniques in which pulses of sound are used. It is the unique ability of the improved ultrasonic-ray-sensitive semiconductors of the present invention to retain or to store ray-induced images that is a fundamental feature contributing to the success and to the importance of the invention. Whereas, the application of continuous wave electronic ultrasonics to practical inspection problems is limited (since standing wave formation makes it difficult to examine objects whose thickness changes rapidly or to move the parts of the system relative to one another) the feasibility of using pulses of sound, as disclosed and taught herein, obviates many difficulties.

The special properties of the semiconductors of the present invention have been found to be related to and to correlate closely with the degree of purity of the chemical compounds and compositions used. It is an important part of the teaching of the invention that an extraordinarily high degree of purity of the ultrasonic-ray-sensitive semiconductors is essential in order to realize or to achieve the high sensitivity which is essential in effective pulsing techniques. Chemicals of at least phosphor grade purity are necessary. The differences realized in accordance with the practice of the present invention are differences in kind rather than differences in degree.

In accordance with the present invention, the ultrasonic-ray-sensitive material forming the panel or layer 31 preferably comprises a cadmium sulfide activated with copper. Other semiconductor materials, such as cadmium sulfide, the combined sulfides of zinc and cadmium, zinc sulphide, zinc oxide, the combined selenides of cadmium and zinc, and titanium dioxide may be employed. In one preferred embodiment of the invention, the semiconductor material or the phonon-responsive material is deposited on a supporting substrate by conventional settling techniques. In another preferred embodiment of the invention, the phonon-responsive salt or composition is deposited on the supporting substrate by evaporation techniques.

Irradiation of the layer 31 by activating ultrasonic rays 12 carrying the latent image of the object 13 will correspondingly alter the impedance of the crystalline semiconductor material of the layer 31 and thus supply a latent image of the object in the layer 31. The latent image itself may be defined in terms of the variation of the impedance characteristics of each integral portion of the panel.

The layer 31 of the ultrasonic-sensitive semiconducting material may be applied upon the panel by disposing the same in a closed evaporation chamber containing a tray or boat of platinum filled with activated semiconducting material preferably in powdered form. The substrate may be supported immediately above the boat in position to receive the layer 31 upon the surface thereof which faces downwardly toward the boat. The evaporation chamber, if desired, may be evacuated and maintained under low vacuum pressure conditions, as by connecting the same with a suitable exhaust pump. Boat-carried semi-conducting material may then be evaporated by heating the same, as by means of an induction heating coil, or other suitable heating means. The vaporized material thus produced in the closed chamber will be applied to and will condense upon the boat-facing surface of the substrate thereby forming the layer 31 upon the panel.

A layer of suitable semiconducting material may also be applied by suspending material in powdered condition in a suitable binder, such as a solution of potassium silicate. Ultrasonic-sensitive layers of the semiconducting material have been successively produced, for example, by suspending the material in a solution of potassium silicate, the semiconducting material being allowed to settle out of the solution upon the supporting substrate or surface, after which the excess solution may be drained off and the layer dried during an interval of the order of an hour or more. Finally, the coated panel is baked at a temperature of the order of 100° C., in a vacuum, if desired, in order to solidify the layer and adhere the same tightly upon the supporting surface.

The layer 31 may also be applied by first mixing the semi-conducting material, in finely divided powdered or dustlike condition, with a suitable carrier or binder, such as lacquer, then painting or spraying the carrier-mixed material at a thin coating upon the supporting surface, and finally drying the coating, including the steps of heating the same, preferably at low, substantially vacuum pressure, and at a temperature assuring removal of all volatile components of the carrier, to achieve a tight binding of the semiconducting material on the surface.

In accordance with the practice of the present invention, improved storage-type television camera tubes have been constructed. The operation of these tubes is based upon the ability of ultrasound to discharge trapped electrons in materials of the zinc sulfide type. These materials are known to exhibit sufficient resistivity to permit storage-type operation.

The tubes have been tested under ultrasound radiation of different frequencies for sensitivity (that is, watts per centimeter squared absorbed to produce a recognizable signal) resolution (that is, detail resoluble as a function of percent contrast of the object), and speed of response (that is, ability to follow the motion of the object used).

In addition, studies have been carried out using a demountable scanning system to investigate the change in resistance due to absorbed ultrasound (piezo resistance) or other materials whose resistivity is sufficiently high to permit storage type operation of a television camera tube.

Thus, important elements of the present invention are special tubes having extensive sensitized phonon-responsive areas and using as target materials such compositions as suitably activated zinc sulfide (ZnS), cadmium sulfide (CdS), cadmium zinc sulfide ($CdZnS_2$), zinc oxide (ZnO), cadmium zinc selenide ($CdZnSe_2$) and titanium dioxide ($TiO_2$). Some of these materials, particularly zinc oxide and titanium dioxide, are known to exhibit piezo-resistive effects.

It is believed that the invention and its numerous attendant advantages will be fully understood from the foregoing description, and it is obvious that numerous changes may be made in the form, construction and arrangement of the several parts without departing from the spirit and scope of the invention, or sacrificing any of its attendant advantages, the form herein disclosed being a preferred embodiment for the purpose of illustrating the invention.

What is claimed is:

1. In an ultrasound viewing system for the non-destructive inspection of biological tissues and including a source of ultrasound radiation, the improvement which comprises an image transducing piezo-resistive storage tube having an ultrasound frequency sensitive layer deposited on a supporting substrate, said layer comprising a phonon-sensitive cadmium sulfide layer activated with copper.

2. A target for converting ultrasound radiation into an electrical signal and comprising a substrate plate having a face portion and an ultrasound-sensitive layer adherent to said face portion, said layer comprising a phonon-sensitive deposit selected from the group consisting of ZnS-Ag, $ZnCdS_2$-Cu, CdS-Cu, $ZnCdS_2$-Ni, CdS-Ag, and CdS-Ag-Cu-Ni.

References Cited by the Examiner
UNITED STATES PATENTS

| | | | |
|---|---|---|---|
| 2,951,898 | 9/1960 | Jacobs | 178—6.8 |
| 2,957,340 | 10/1960 | Rocha | 178—6 |
| 3,013,170 | 12/1961 | Sheldon | 313—6.8 |

FOREIGN PATENTS

| | | |
|---|---|---|
| 841,025 | 7/1960 | Great Britain. |

DAVID G. REDINBAUGH, *Primary Examiner.*